(12) United States Patent
Korjenic (10) Patent No.: US 6,477,986 B1
(45) Date of Patent: Nov. 12, 2002

(54) SHEARING LIFTING JACK (76) Inventor: Hamid Korjenic, 4/10 Victoria Avenue, Penshurst, New South Wales, 2222 (AU)

( * ) Notice: Subject to any disclaimer, the term of this patent is extended or adjusted under 35 U.S.C. 154(b) by 0 days.

(21) Appl. No.: 09/508,987
(22) PCT Filed: Sep. 18, 1998
(86) PCT No.: PCT/AU98/00779
§ 371 (c)(1), (2), (4) Date: May 12, 2000
(87) PCT Pub. No.: WO99/13706
PCT Pub. Date: Mar. 25, 1999

(30) Foreign Application Priority Data

Sep. 18, 1997 (AU) .............................................. PO9250

(51) Int. Cl.[7] .............................................. A01K 15/04
(52) U.S. Cl. ...................................................... 119/757
(58) Field of Search ................................ 119/752, 753, 119/728, 756, 757

(56) References Cited

U.S. PATENT DOCUMENTS

| 3,186,380 A | * | 6/1965 | Roney | 119/757 |
| 3,717,128 A | * | 2/1973 | Pearman et al. | 119/757 |
| 4,148,280 A | * | 4/1979 | Masuda et al. | 119/757 |
| 4,850,308 A | * | 7/1989 | Padgett | 119/757 |
| 5,469,812 A | * | 11/1995 | Burks | 119/728 |
| 6,089,192 A | * | 7/2000 | Gent | 119/752 |

* cited by examiner

Primary Examiner—Charles T. Jordan
Assistant Examiner—Elizabeth Shaw
(74) Attorney, Agent, or Firm—Edwin D. Schindler (57) ABSTRACT Shearing lifting jack for shearing sheep comprises a cradle (31) for holding a sheep on its back or stomach and which is shaped so as to allow the sheep to be rolled from its back to its stomach or vice versa during the shearing operation. Lifting means for example in the form of a rolling chain (20) is provided to move the cradle from a first loading/unloading position adjacent the floor of a shearing shed or other suitable location for shearing sheep and a second raised position for shearing the sheep approximating the height of a work bench. This allows the sheep to be lifted whilst it is shorn in order that the sheerer avoids bending over the sheep. The lifting means is operable between the first loading/unloading position and second shearing position by a single unassisted shearer.

12 Claims, 7 Drawing Sheets

SHEARING LIFTING JACK

This invention relates to improvements in the sheep shearing industry and in particular relates to means for mechanically lifting a sheep from the floor and means for holding the sheep in that position for a shearer to shear it.

BACKGROUND OF THE INVENTION

Sheep are generally shorn by a shearer who, whilst holding the sheep on the floor, straddles the sheep and removes the fleece according to common practice with a pair of hand-held shears. This means that the shearer is bending over the sheep whilst shearing it, which requires strength and stamina on the part of the shearer to restrain the sheep whilst he shears it. Furthermore, he must at all times keep one hand on the sheep whilst wielding the cutting shears with the other. As the sheep struggles it is likely that at least minor nicks and grazes will result.

OBJECT OF THE INVENTION

It would therefore be highly desirable to provide a lifting arrangement suitable for holding a sheep which is to be shorn and raising it to the equivalent of bench height or thereabouts, which overcomes some of the recognised shortcomings in manipulating a sheep whilst shearing it according to current practice. To this end, a lifting jack has been devised which overcomes or at least ameliorates some of the foregoing disadvantages of present shearing techniques. At the very least, the invention provides an alternative to the present practice of shearing sheep whilst bending over them and holding them by hand.

DISCLOSURE OF THE INVENTION

According to the present invention there is provided a lifting jack for shearing sheep, which comprises a cradle for holding a sheep on its back or stomach and which is shaped so as to allow the sheep to be rolled from its back to its stomach or vice versa during the shearing operation, lifting means in the form of a chain and sprocket mechanism to move the cradle from a first loading/unloading position adjacent the floor of a shearing shed or other suitable location for shearing sheep and a second raised position for shearing the sheep approximating the height of a work bench so that the sheep is able to be lifted whilst it is shorn in order that the shearer avoids bending over the sheep, the lifting means being operable by a suitably located foot pedal between the first loading/unloading position and second shearing position by a single unassisted shearer, so that in use a shearer is able to place a sheep in the cradle at floor height and whilst either holding the sheep himself or otherwise restraining the sheep with a chain or belt or the like is then able to cause the cradle to be lifted, and wherein locking means are provided in association with the foot pedal so that after a predetermined length of travel corresponding to the required raising of the cradle, the pedal can be locked in its lower position, without the need for the shearer to keep his foot thereon, thereby preventing the cradle from returning to its first loading/unloading position until shearing has been completed when the locking mechanism is released to allow the cradle to be returned.

Preferably, the cradle is provided with restraining means, for example in the form of a chain which can be passed over the sheep and located over some suitable projection or hook or alternatively the restraining means comprises a belt which may be fastened by known means, to allow the sheep to be restrained for at least part of the shearing process so that the sheerer is able for at least part of the shearing operation to have both hands free of the sheep.

Thus, the lifting means of the shearing lifting jack comprises a chain and sprocket mechanism operable by a suitably located foot pedal, so that in use a shearer is able to place a sheep in the cradle at floor height and whilst either holding the sheep himself or otherwise restraining the sheep with a chain or belt as described above is then able to cause the cradle to be lifted.

For example a simple chain drawn over a single sprocket, where the chain is affixed at or near one end to the cradle and the where other end is attached to s foot or hand operable pedal, will allow the shearer to push down on the raised pedal, when the sheep is loaded to the cradle, thereby causing the cradle to lift as the pedal is pushed down. Preferably the weight of the cradle and sheep will be offset to a reasonable degree by the weight of the foot pedal (ie they will be in rough equilibrium with the greater weight provided by the cradle and sheep) so that the effort required to raise or lower the sheep is lessened.

Preferably the looking means is provided in the form of a notched plate pivotally attached to the pedal which may be slid into locking engagement with a suitable projection located for the purpose on the shearing lifting jack so that the pedal is locked in its lower position whilst the cradle is in its second shearing position.

As an alternative to the aforementioned manual operation, the lifting means may be operated by means of a suitable motor. Thus for example, in addition to the aforementioned chain and socket arrangement as described above, there is provided a second chain which is connected between the foot pedal and cradle or the ends of the first chain itself to form a continuous loop with the first chain (ie the pedal and cradle either being the points of attachment for the respective ends of the two chains or where the chains themselves are otherwise suitably connected, the cradle and/or foot pedal may be suitably attached to appropriate portions of the chain as required).

In this embodiment, a second sprocket is suitably positioned in relation to the second chain so that a motor either directly or indirectly operates on the second sprocket to cause the whole chain assembly (comprising both chain portions) and hence the cradle to move. In this embodiment, the motor itself, may act as a brake to prevent return of the cradle to the first loading position. It will also be appreciated that the foot pedal itself may in fact be removed altogether as it is effectively redundant. However, with advantage, it may be useful to incorporate it in the design of such a jack to facilitate operation thereof when power is not available, or at least readily available, in the field. In addition the foot pedal may provide added safety by allowing manual locking of the jack in addition to the braking afforded by the motor.

It will also be readily appreciated that it would be advantageous to provide isolating switches located at suitable positions (eg which are contacted by the cradle at the end of its travel) so that the motor is stopped or otherwise disengaged (eg by suitable clutch means) from driving the sprocket and chain assembly so that travel thereof is limited and hence the cradle, and where it exists the foot pedal, are prevented from causing damage through further unwanted motion, or the motor itself is prevented from being damaged.

Preferably, the chain and sprocket arrangement of either embodiment is housed in a substantially upright support housing in the form of a hollow post which protects the chain and sprocket both from the point of view of safety and in order to keep it clean. More preferably the support housing or post has substantially vertical slots located therein on opposite sides thereof, which form guides or tracks through which extend connecting means to support the cradle on one side of the housing and to support or connect with the foot pedal on the other side. These connecting means are preferably provided with suitable means to assist their sliding in the aforementioned guides or tracks, for example in the form of suitable located wheels which run on the internal and/or external surface of support housing.

With advantage, the shearing lifting jack is also provided with suitable support means in the form of a base plate which can be affixed to the floor and which supports the substantially vertical or upright structure or post which houses the chain and sprocket mechanism and from which extend the cradle and foot pedal.

Other means of motor drive apart from an individual motor connected to the jack are also contemplated, for example involving power derived from suitable belt and pulley systems as found in shearing sheds and the like, where by suitable modification the invention may also be employed.

A shearing lifting jack, according to one embodiment of the invention, is preferably of metal design, constructed primarily from mild steel and employing high engineering tolerances in its construction. The shearing lifting jack is preferably made from steel plate of sufficient quality to ensure that it remains robust. The shearing lifting jack of this embodiment is relatively heavy being around 83 kg, although its weight will depend on the particular gauges etc of the materials specified. This weight helps the shearing lifting jack remain in a stable position during use. The overall height of the shearing lifting jack is preferably around 1030 mm. It needs no more that one square meter of floor space. Thus a shearer needs only 1 sq m of space in the shearing shed when operating the shearing lifting jack, allowing for both the shearer himself and the sheep as well as the jack, although in practice it is preferable to allow say a space of 1.5 sq m per jack. One jack is utilised per shearer With advantage, the shearing lifting jack is affixed to the floor with screws for a wooden floor or with bolts for a concrete floor. It must be remembered that the sheerer is dealing with untrained animals in the form of sheep of varying size and weight from 15 to 140 kg. However, working with this lifting jack makes it very easy for the shearer.

The invention is designed to help a shearer accomplish the job of shearing faster and more easily. A shearer utilising the jack according to the invention will have both legs free and he will be working in a vertical position like a person working at a bench rather than having to bend over the sheep. He will be able to easily drag a sheep onto the towered cradle, the sheep being initially located in an upturned manner. Here he will be able to attend to the shearing of the neck, head, legs and under belly of the sheep; before turning the sheep over on its back to complete the shearing operation. The time for a shearer to bring a sheep onto the stand and lift it with this invention will generally be no longer than about 10 seconds.

BRIEF DESCRIPTION OF THE DRAWINGS

A preferred embodiment of the present invention will now be described with reference to the accompanying drawings of which.

BEST MODE OF CARRYING OUT THE INVENTION

Figure 1:
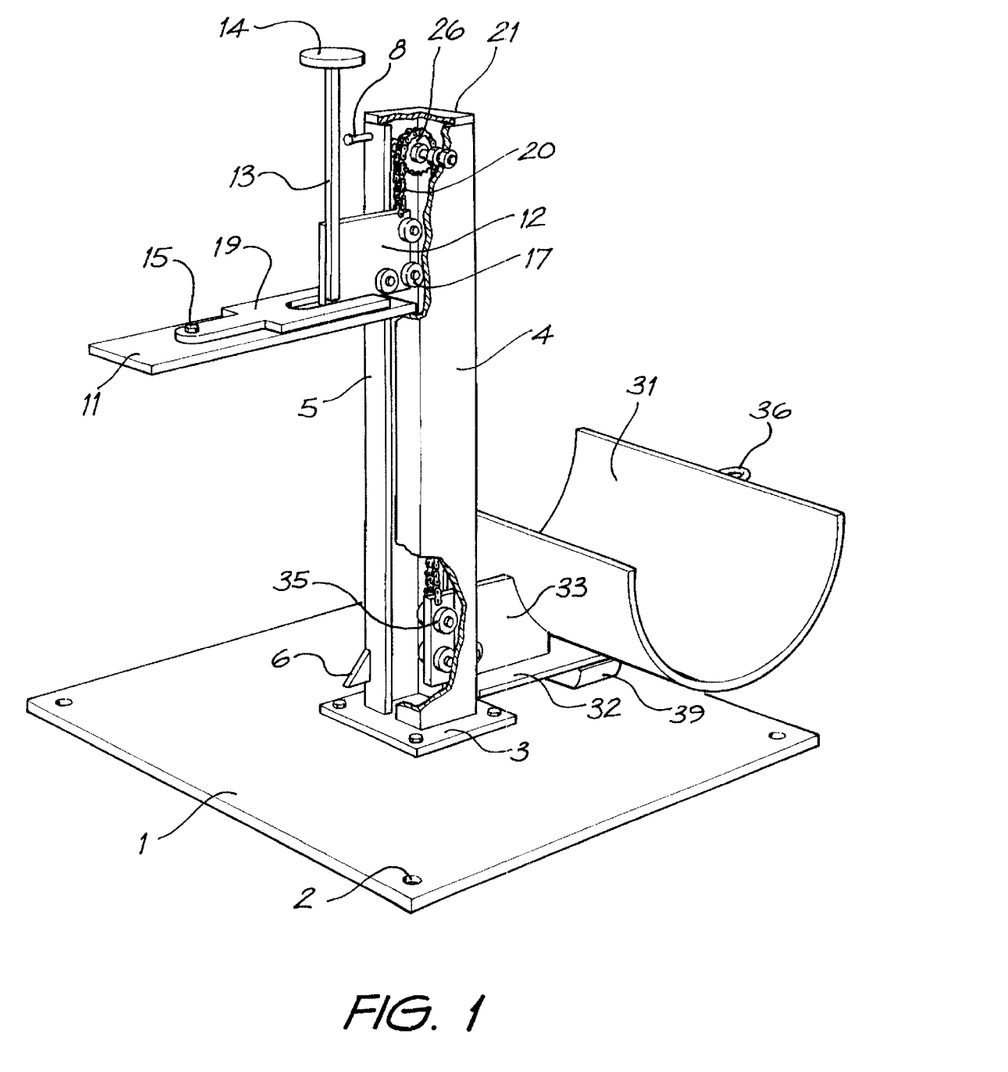
FIG. 1 is a perspective view of a shearing lifting jack according to one embodiment of the invention.
Figure 2:
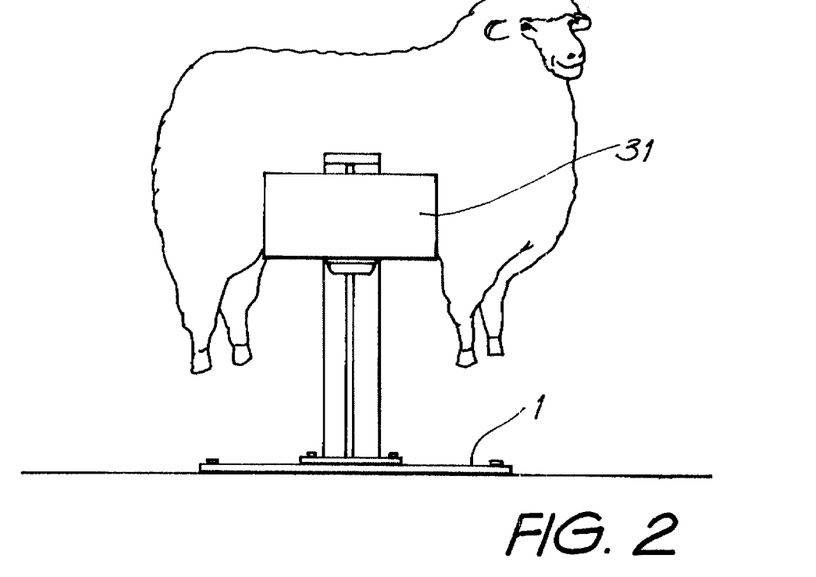
FIG. 2 is a sketch showing how the shearing lifting jack of FIG. 1 supports a sheep under its belly.
Figure 3:
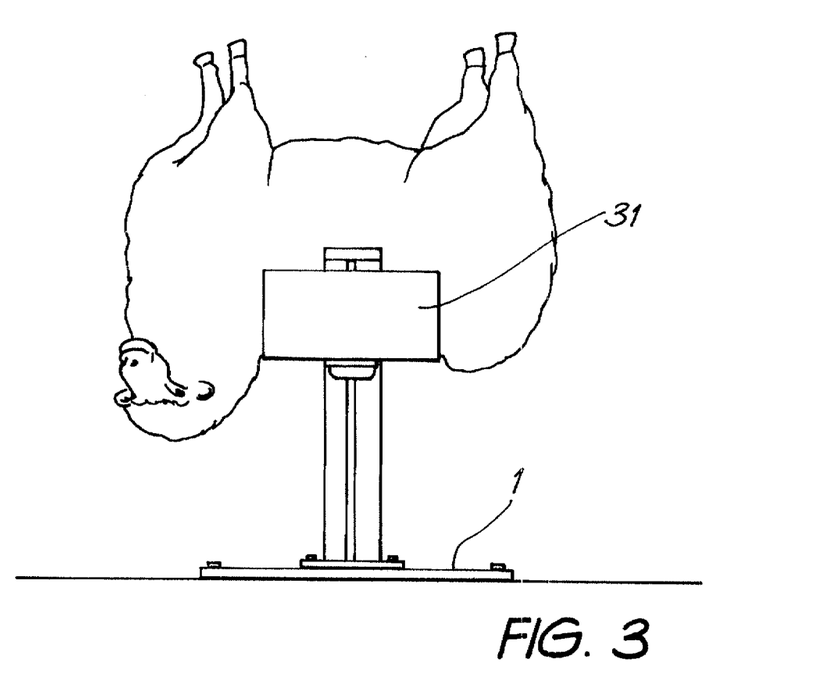
FIG. 3 is a sketch showing how the shearing lifting jack of FIG. 1 supports a sheep lying on its back on top of the shearing lifting jack, in a position ready for shearing.

Referring generally to the Figures and especially FIG. 1, there is shown a shearing lifting jack according to a first embodiment of the invention. A base plate 1 is preferably made from 5 to 8 mm mild steel plate and has an area of 1 sq m. The base plate 1 is designed to support the total structure of the shearing lifting jack. The base plate 1 has an outer set of four holes 2 in each corner. Screws or bolts (not illustrated) are used to affix the base plate 1 to the floor or ground as required utilising this outer set of holes 2.

The base plate 1 also has four additional holes located approximately 150 mm apart near the centre by means of which there is attached to the base plate 1, by means of suitable nuts and bolts or other fasteners, a support plate 3 also with 4 holes in each corner corresponding to the centrally located holes in base plate 1.

Figure 4:
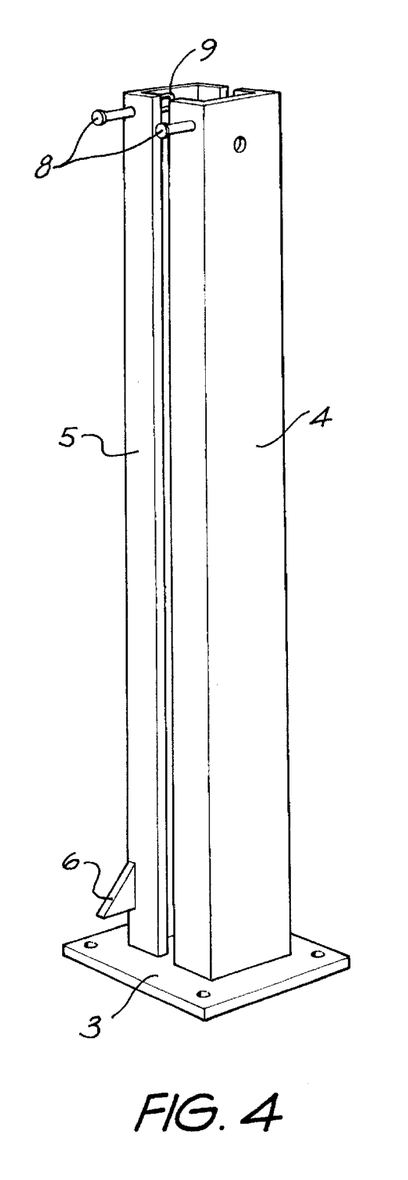
FIG. 4 is a detailed perspective view of the post structure of the shearing jack of FIG. 1.

Welded to the support plate 3 are two C-shaped steel sections, being a right half post 4 and left half post 5 which in combination form a hollow support post for the shearing lifting jack. Each half post 4 and 5 is preferably around 1000 mm high, and has an overall cross-sectional dimension of 120 mm×60 mm. The half posts are located preferably 8 mm apart along their length to provide two channels in opposite sides of the support post.

A fixed brake plate 6 in the form of a triangular shaped protrusion is welded to the left half post 5 near the base thereof.

Figure 7:
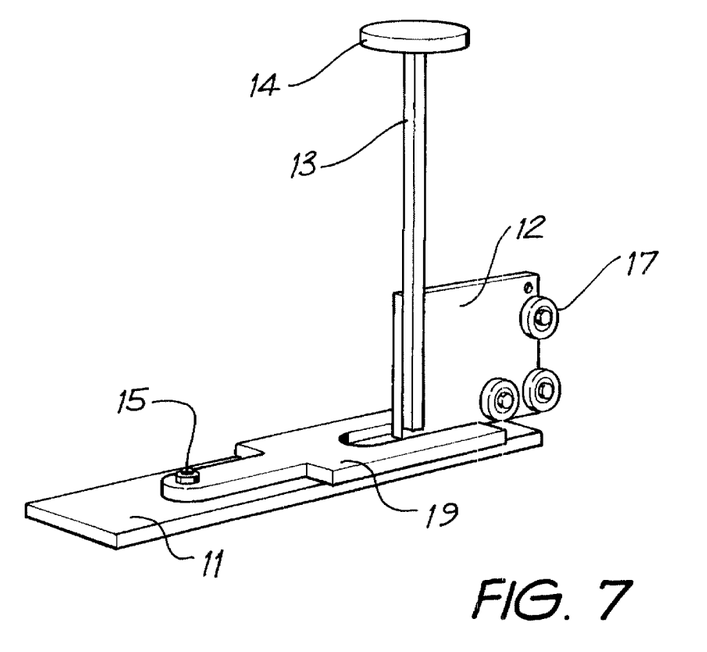
FIG. 7 is a detailed perspective view of the hand and foot pedal of the shearing lifting jack of FIG. 1.
Figure 8:
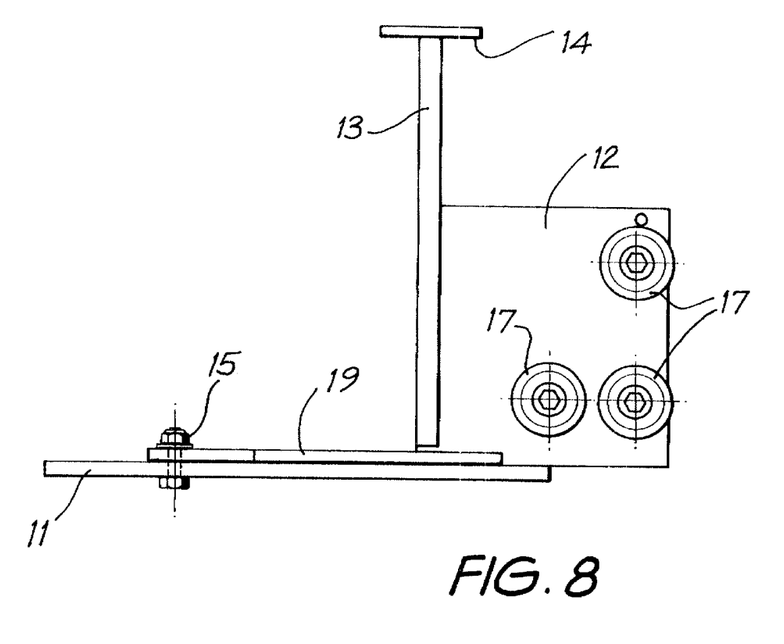
FIG. 8 is a detailed side elevation of the hand and foot pedal of the shearing lifting jack of FIG. 1.

The foot press pedal assembly comprises a horizontal plate 11 and an upright sliding plate 12 which extends vertically therefrom and extends through the channel located between the right and left half posts 4,5. To plate 12 is attached three pairs of ball bearing rollers 17, located so that one pair is external the channel and two pairs are internal as illustrated. A hand stick 13 extends vertically along the front edge of plate 13 and is provided with a knob 14 to provide additional flexibility in operation. A rotatable brake plate 14 is pivotally mounted on horizontal plate 11, by means of suitable nut and bolt 15. In the lower position, the rotatable brake plate 19 can be pushed sideways to engage with the fixed brake plate 6.

Figure 9:
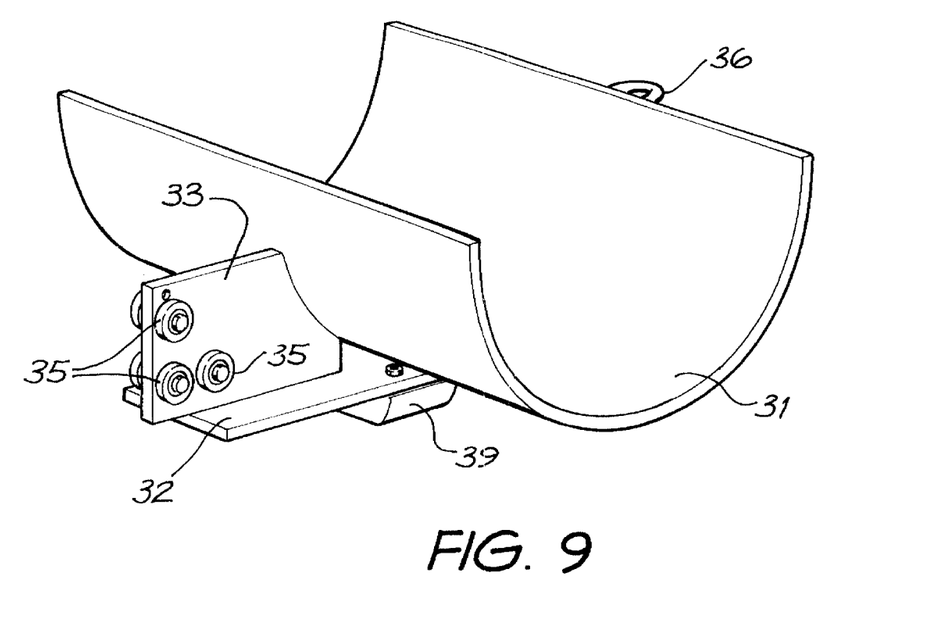
FIG. 9 is a detailed perspective view of the lifting arm of the shearing lifting jack of FIG. 1.
Figure 10:
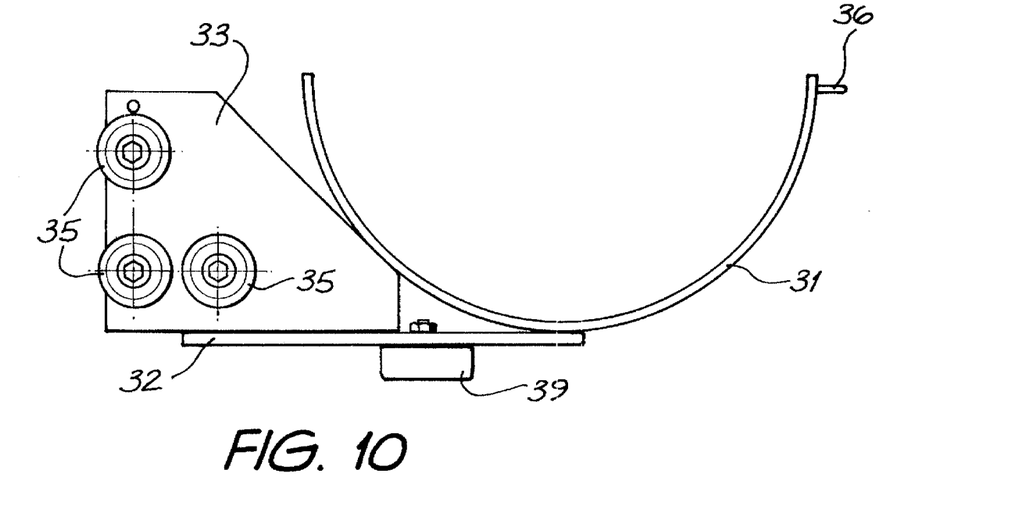
FIG. 10 is a detailed side elevation of the lifting arm of the shearing lifting jack of FIG. 1.

Located opposite the foot press pedal assembly and connected thereto by means of rolling chain 20 is the lifting arm assembly comprising a half round saddle or cradle 31 suitable for accommodating a sheep on its back or its stomach, supported on a horizontal plate 32. Extending vertically therefrom is an upright sliding plate 33 which extends through the channel on the opposite side to that on which the foot pedal assembly is located, between the right and left half posts 4,5. Upright sliding plate 33 is equipped with ball bearing rollers 35 and functions in the same way as the upright plate 12 of the foot pedal assembly described above.

Figure 6:
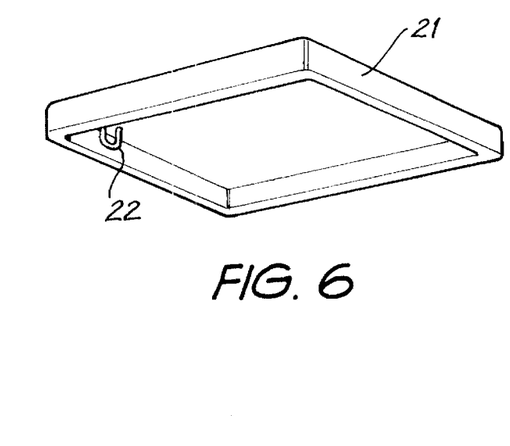
FIG. 6 is a detailed perspective view of the cap which fits over the post of the shearing lifting jack of FIG. 1.

There is provided a ring 9 or other suitable attachment means for holding a chain 23 which is attached to a removable cap 21. The ring or chain holder 9 is welded inside the left post 3 near the top. Cap 21 is provided with an attachment ring 22 to which is attached the other end of chain 23. The cap 21 is used to cover the top of the two half posts 4,5 to prevent fleece or dirt from falling into the post or to otherwise provide safety in operation by preventing hands or fingers etc from getting caught in the inner workings of the lifting jack.

A suitable ring or chain holder 36 is attached to the cradle 31 to allow attachment of a suitable chain (not illustrated) for holding the sheep securely during the shearing operation. Adjacent the top of the post on each half thereof are also located a pair of pins 8 for holding the other end of such a chain. These two pins are welded 20 mm from top of the post on each side of the structure.

A rubber landing pad 39 is located under the horizontal plate 32 to cushion the cradle assembly as it descends to the first loading/unloading position.

Figure 5:
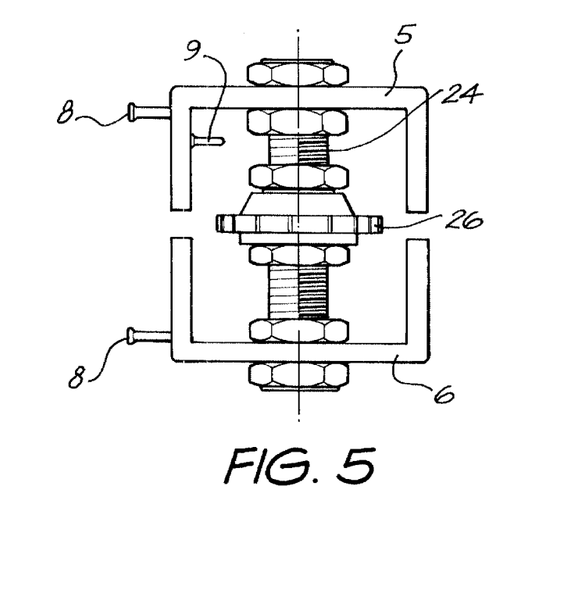
FIG. 5 is a plan view showing the detail of the sprocket and bearing located at the top of the post structure of the shearing lifting jack of FIG. 1.

The rolling chain 20 is supported on a sprocket 26 mounted on rod 24, which is located between the two half posts 4,5, near their top.

Figure 11:
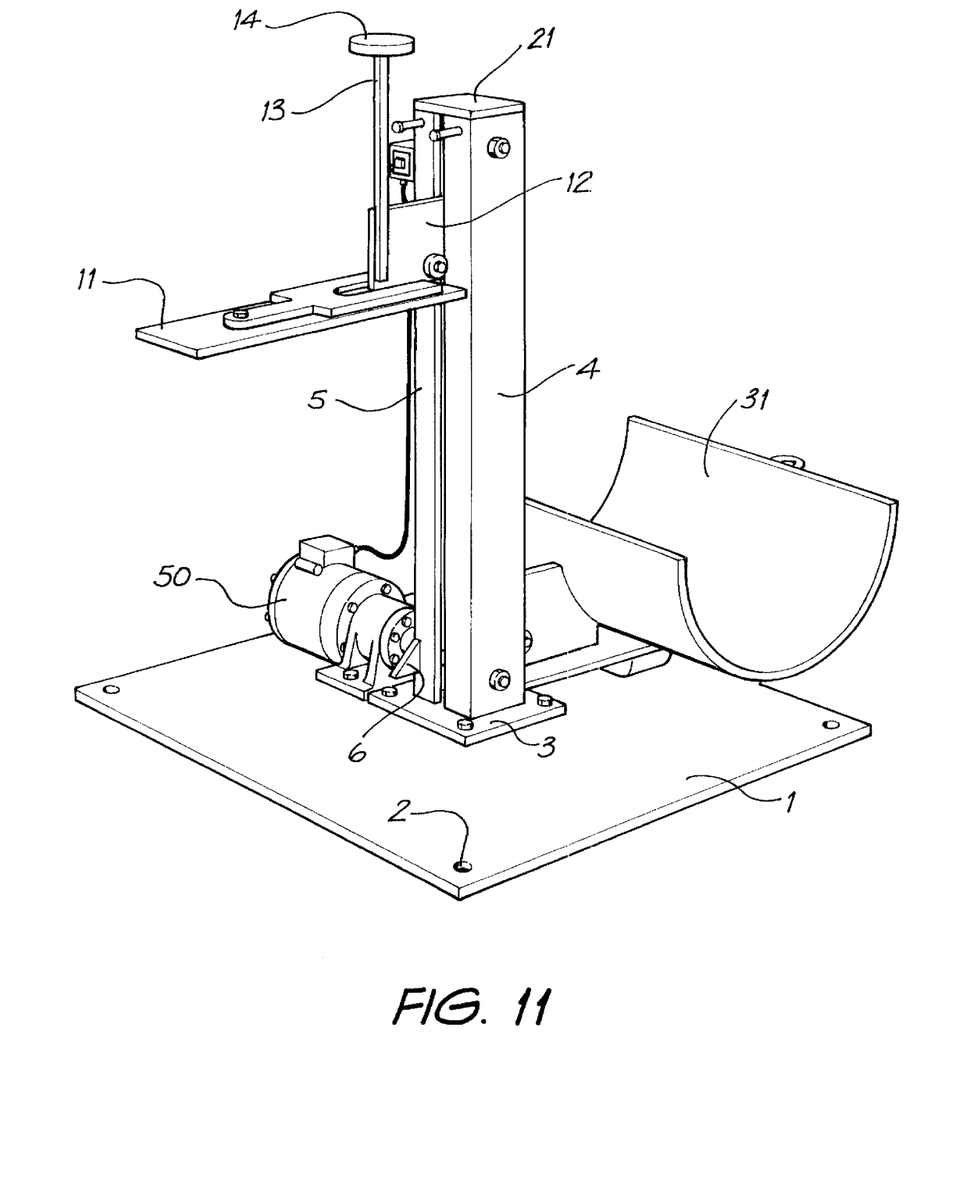
FIG. 11 is a perspective view of an alternate embodiment of the invention utilising a motor to raise and lower the cradle assembly.
Figures 12, 13:
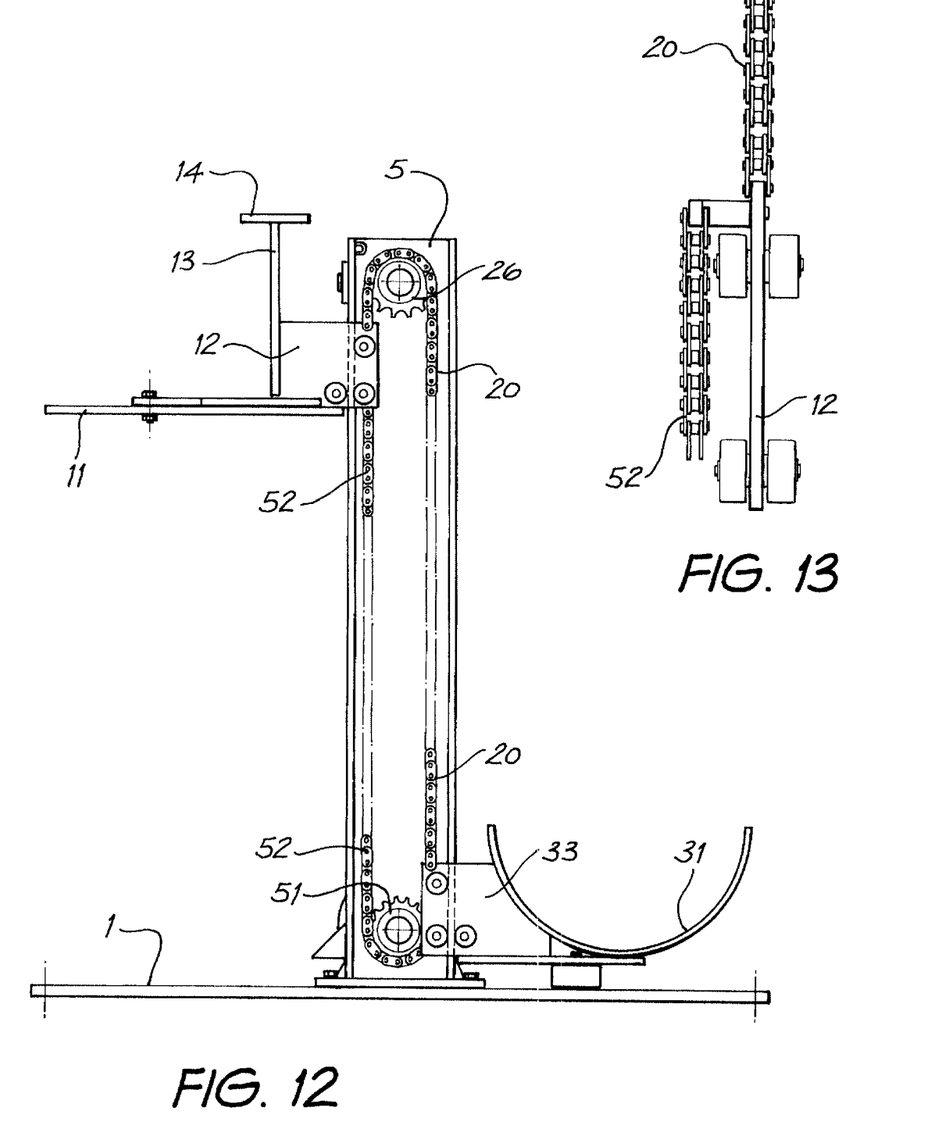
FIG. 12 is a detailed side elevation of the internal workings of the chain portions connecting the foot pedal assembly cradle assembly of the embodiment shown in FIG. 11.
FIG. 13 is an end elevation showing the detail of the chain portions illustrated in FIG. 12.

A similar lifting jack is illustrated in FIG. 11 to 13, except that it is powered by a motor. Like feature are illustrated utilising the same reference numbers. Specifically a motor 50 is located on the base plate 1 and is connected to a second sprocket 51. A second chain 52 is connected between the respective upright sliding plates 12 and 33 of the foot pedal assembly and cradle assembly. The second chain 52 is offset as shown in FIG. 13 to allow clearance.

This shearing lifting jack according to the invention is designed for two purposes, namely to lift the sheep for shearing and to also to lift the sheep for trimming. The jack is designed to lift the sheep about 0.75 m from the floor or to approximate working at bench height. When the sheep on located on the cradle and raised the shearer must turn the sheep on its back. After that he will tie the sheep down utilising a chain tied over its belly. Shearing may then commence. The shearer must start from the front legs below the neck and move towards and under the head, opening the fleece as he goes. Following this, shearing continues on the head, neck, and all four legs. Once shearing commences on the belly, the chain will be removed. When the belly is completed it is necessary to shear two to four times along the right side of the body of the sheep for a right handed shearer. After this shearer has to roll the sheep away from himself and shearing commences along the other side of the body of sheep. When the sheep has been rolled so that it becomes vertical (ie with its legs to the floor again), the shearer will have the top of the body of sheep available to complete the shearing. When he has finished shearing he will only have to release the brake and drop the sheep onto the floor, the sheep will then be free to move away. Working in this way the fleece will stay in one piece which is a significant advantage.

When utilising the jack for trimming it is only necessary to lift the sheep under its belly and there will be no need to tie it. In this way, when the sheep is lifted and the shearer will have a good view to do his work.

With this jack it is possible to shear sheep anywhere including in the paddock. The only requirement will be the provision of power for the shearing tools.

It is recommended that the shearing lifting jack be affixed to the floor with screws or with bolts for concrete floor. However, its very weight ensures a reasonably safe operation on airy ground and allows it to remain portable if necessary.

The foregoing describes only one embodiment of the present invention, and modifications obvious to those skilled in the art can be made thereto without departing from the scope of the present invention.

What is claimed is:

1. A lifting jack for shearing sheep, comprising:
   a cradle for holding a sheep on its back or stomach, said cradle being shaped for allowing the sheep to be rolled from its back to its stomach, or vice-versa, during a shearing operation;
   lifting means formed as a chain-and-sprocket-mechanism for moving said cradle from a first loading/unloading position adjacent a floor of a shearing shed for shearing sheep to a second raised position for shearing the sheep of approximately a height of a work bench, so that the sheep is able to be lifted while the sheep is shorn in order that a person shearing the sheep avoids bending over the sheep, said lifting means being operable by a foot pedal between said first loading/unloading position and said second raised position for shearing by a single unassisted person shearing the sheep, so that in use the person is able to place the sheep in said cradle at a floor height and, while either holding the sheep himself or otherwise restraining the sheep, the person is able to cause said cradle to be lifted; and,
   locking means for use with said foot pedal of said lifting means, so that after a predetermined length of travel corresponding to a required raising of said cradle, said foot pedal is able to be locked in its lower position, without the need of the person to maintain his foot on said foot pedal, thereby preventing said cradle from returning to its said first loading/unloading position until shearing of the sheep has been completed when said locking means is released for allowing said cradle to be returned.

2. The lifting jack for shearing sheep according to claim 1, wherein said locking means is a notched plate pivotally attached to said foot pedal and slidable into a locking engagement with a projection located on said lifting jack, so that said foot pedal is lockable in its lower position while said cradle is in its said second raised position for shearing.

3. The lifting jack for shearing sheep according to claim 1, wherein said lifting means is operable via a motor.

4. The lifting jack for shearing sheep according to claim 3, wherein said motor acts as a brake for preventing return of said cradle to said first loading/unloading position.

5. The lifting jack for shearing sheep according to claim 1, wherein said chain-and-sprocket-mechanism of said lifting means is housed in a substantially upright support housing formed as a hollow post for protecting the chain and the sprocket of said chain-and-sprocket-mechanism from damage and for safety.

6. The lifting jack for shearing sheep according to claim 5, said substantially upright support housing has substantially vertical slots located therein on opposite sides thereof, which forms guides or tracks through which extends connecting means for supporting said cradle on a first side of said support housing and for supporting, or connecting, said foot pedal on a second side of said support housing.

7. The lifting jack for shearing sheep according to claim 6, wherein said connecting means includes means for assisting sliding in said guides or tracks.

8. The lifting jack for shearing sheep according to claim 7, wherein said means for assisting sliding in said guides or tracks includes wheels located on at least one of an internal surface or an external surface of said support housing.

9. The lifting jack for shearing sheep according to claim 1, wherein said cradle is provided with restraining means for allowing the sheep to be restrained for at least part of a shearing procedure, so that the person conducting the shearing procedure is able, for at least a portion of the shearing procedure, to have both hands free of the sheep.

10. The lifting jack for shearing sheep according to claim 9, wherein said restraining means is a chain passable over the sheep and located over a projection or a hook.

11. The lifting jack for shearing sheep according to claim 9, wherein said restraining means is a belt able to be fastened for restraining the sheep.

12. The lifting jack for shearing sheep according to claim 1, further comprising support means formed as a base plate able to be affixed to a floor surface for supporting a substantially upright support housing for housing said chain-and-sprocket-mechanism of said lifting means and from which extends said cradle and foot pedal.

* * * * *